(12) United States Patent
Mossman

(10) Patent No.: US 7,493,820 B2
(45) Date of Patent: Feb. 24, 2009

(54) GAS PUMP FILTER OPTIMIZATION AND ALARM SYSTEM WITH GPS AND WEB ENABLED MONITORING

(76) Inventor: Guy E. Mossman, 270 W. Coleman Blvd., Mt. Pleasant, SC (US) 29464

( * ) Notice: Subject to any disclaimer, the term of this patent is extended or adjusted under 35 U.S.C. 154(b) by 0 days.

(21) Appl. No.: 11/826,475

(22) Filed: Jul. 16, 2007

(65) Prior Publication Data
US 2009/0019946 A1 Jan. 22, 2009

(51) Int. Cl.
*G01L 13/00* (2006.01)
*G01L 15/00* (2006.01)

(52) U.S. Cl. ............... 73/716; 73/861.02; 702/182; 340/606

(58) Field of Classification Search ............ 73/53.05, 73/56.07, 716, 861.47, 861.02, 861.63; 702/182–190; 340/552, 603, 606, 607
See application file for complete search history.

(56) References Cited

U.S. PATENT DOCUMENTS

| | | | |
|---|---|---|---|
| 4,947,153 A | 8/1990 | Berger | |
| 5,199,306 A | 4/1993 | Hunter | |
| 5,469,749 A | 11/1995 | Shimada et al. | |
| 5,702,592 A | 12/1997 | Suri et al. | |
| 6,051,144 A | 4/2000 | Clack et al. | |
| 6,096,224 A | 8/2000 | Champie | |
| 6,202,483 B1 | 3/2001 | Barcus | |
| 6,334,959 B1 | 1/2002 | Sutton et al. | |
| 6,377,171 B1 | 4/2002 | Fewel | |
| 6,736,980 B2 | 5/2004 | Moscaritolo | |
| 6,842,117 B2 | 1/2005 | Keown | |
| 7,174,273 B2 | 2/2007 | Goldberg | |
| 2004/0260470 A1* | 12/2004 | Rast | 701/300 |

* cited by examiner

*Primary Examiner*—Andre J Allen
*Assistant Examiner*—Jermaine Jenkins
(74) *Attorney, Agent, or Firm*—Merek, Blackmon & Voorhees, LLC

(57) ABSTRACT

An apparatus for monitoring fuel filter performance and transmitting performance information. The performance information may be transmitted wirelessly to a computer or a wireless telephone and then transmitted to a technician. The performance information is preferably transmitted with location information which identifies the location of the filter for which maintenance is required. The information may also be transmitted to a web server which can store the information in a database and also send information via text messaging or telephone voice transmission or other automatic electronic transmission mechanism.

18 Claims, 3 Drawing Sheets

US 7,493,820 B2

GAS PUMP FILTER OPTIMIZATION AND ALARM SYSTEM WITH GPS AND WEB ENABLED MONITORING

FIELD OF THE INVENTION

The present invention is directed to an apparatus and method for monitoring the fuel filters located at a gas pump analysing data and signaling when replacement is needed. Fuel filters require replacement when they become clogged with contaminants and fuel can no longer pass freely through the filter media or is experiencing a reduced flow. By monitoring the status of the filter and replacing clogged filters, the gas pump can be maintained in optimum operating condition.

BACKGROUND OF THE INVENTION

Fuel stations typically have several fuel/gas pumps to sell fuel to motorists. In order to prevent contaminates such as sludge or sediment from being pumped into the fuel tanks of vehicles, the fuel pumps generally include fuel filters to strain the fuel prior to dispensing into the tank of a customer's vehicle. Typically a separate filter is required for each grade of fuel supplied to each dispenser so that a single fuel dispenser may have three or more filters. When the filters function as designed, the filter will eventually become clogged and fuel flow through the dispenser will become degraded and the dispenser will no longer operate. In many modern fuel dispensing stations, the station will be staffed by clerks who are not qualified to perform any sort of maintenance on the fuel dispensers and when a dispenser stops operating the clerks may be unaware that an interruption has occurred and even when the interruption in operation is discovered, all that can be done is to call in a person skilled in repair of the pumps to diagnose the cause of the interruption.

In view of the foregoing it can be seen that there is a need for a new fuel dispenser monitoring system to provide operating diagnostics and automated maintenance requests to enhance the operability of fuel delivery systems.

OBJECTS AND SUMMARY OF THE INVENTION

An object of a preferred embodiment of the present invention is to provide a novel and unobvious method and/or apparatus for monitoring of a fuel pump filter.

Another object of a preferred embodiment of the present invention is to provide an apparatus that is designed to measure the flow of fluid through a fuel pump filter.

A further object of a preferred embodiment of the present invention is to provide a remote signal activator to provide notice of required maintenance.

Yet still another object of a preferred embodiment of the present invention is to provide an apparatus having a telephonic alarm system to provide notice of required maintenance.

Still a further object of a preferred embodiment of the present invention is to provide an apparatus that can provide location information along with a maintenance notice to identify the location of and provide directions to the fuel station.

Another object of a preferred embodiment of the present invention is to provide a signal to a web server to supply maintenance information to a database.

A further object of a preferred embodiment of the present invention is to provide a text message to a technician that maintenance is required.

Still a further object of a preferred embodiment of the present invention is to provide a monitoring center which collects and distributes maintenance information.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to an apparatus for monitoring fuel filter performance and transmitting performance information for analysis, archiving or action. The performance information may be transmitted wirelessly to a computer or a wireless telephone and then transmitted to a technician. The performance information is preferably transmitted with location information which identifies the location of the filter for which maintenance is required. The information may also be transmitted to a web server which can store the information in a database and also send information via text messaging or telephone voice transmission or other automatic electronic transmission mechanism.

DETAILED DESCRIPTION OF THE PREFERRED EMBODIMENT OF THE INVENTION

The most preferred form of the invention will now be described with reference to FIGS. 1-3. The appended claims are not limited to the most preferred form and no term used herein is to be given a meaning other than its ordinary meaning unless otherwise stated.

Figure 1:
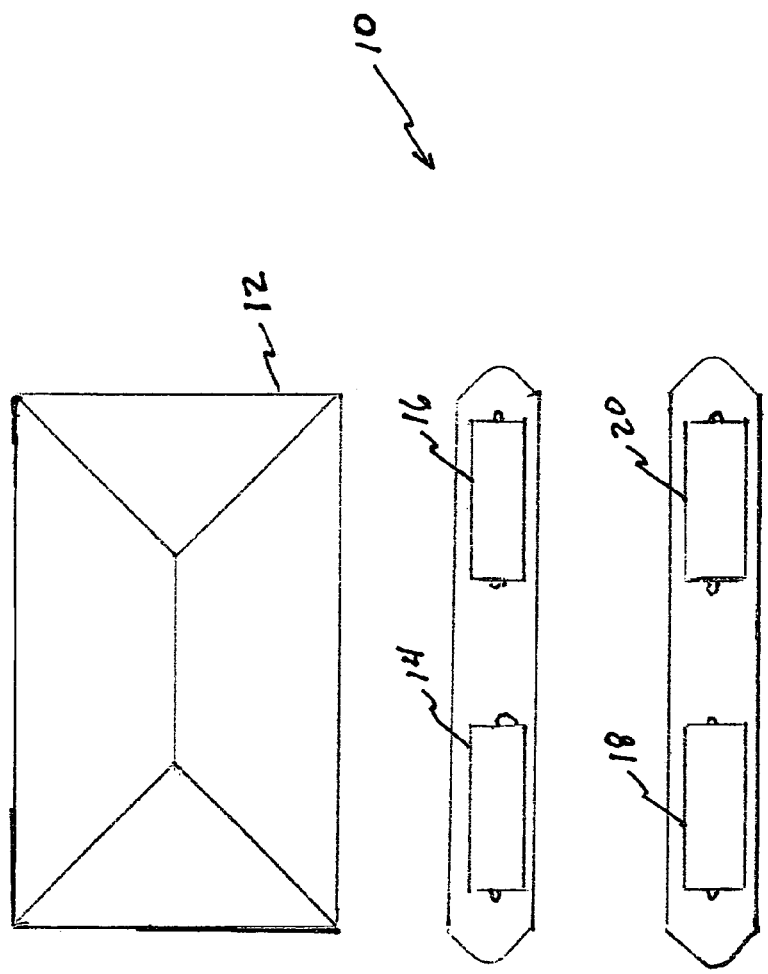
FIG. 1 is a schematic view of a gas station having fuel dispensing pumps.

The fuel station 10 shown in FIG. 1 includes a typical building 12 and fuel dispensers or pumps 14, 16, 18 and 20. While it is common for modern fuel stations to have many more fuel dispensers, the number has been reduced in this example for simplicity.

Figure 2:
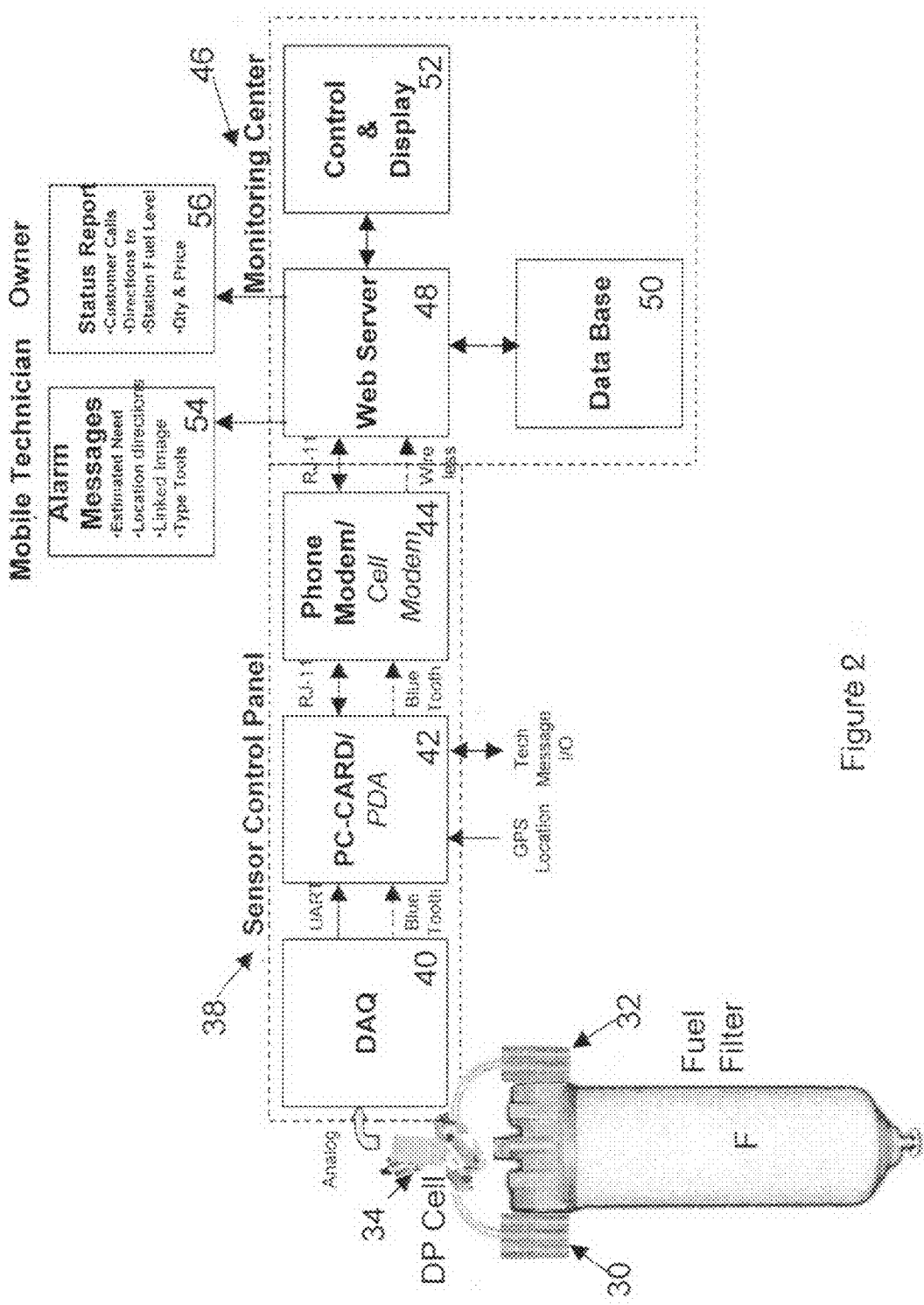
FIG. 2 is a schematic view of a fuel filter having a sensor connected to sensor control panel and a monitoring center.
Figure 3:
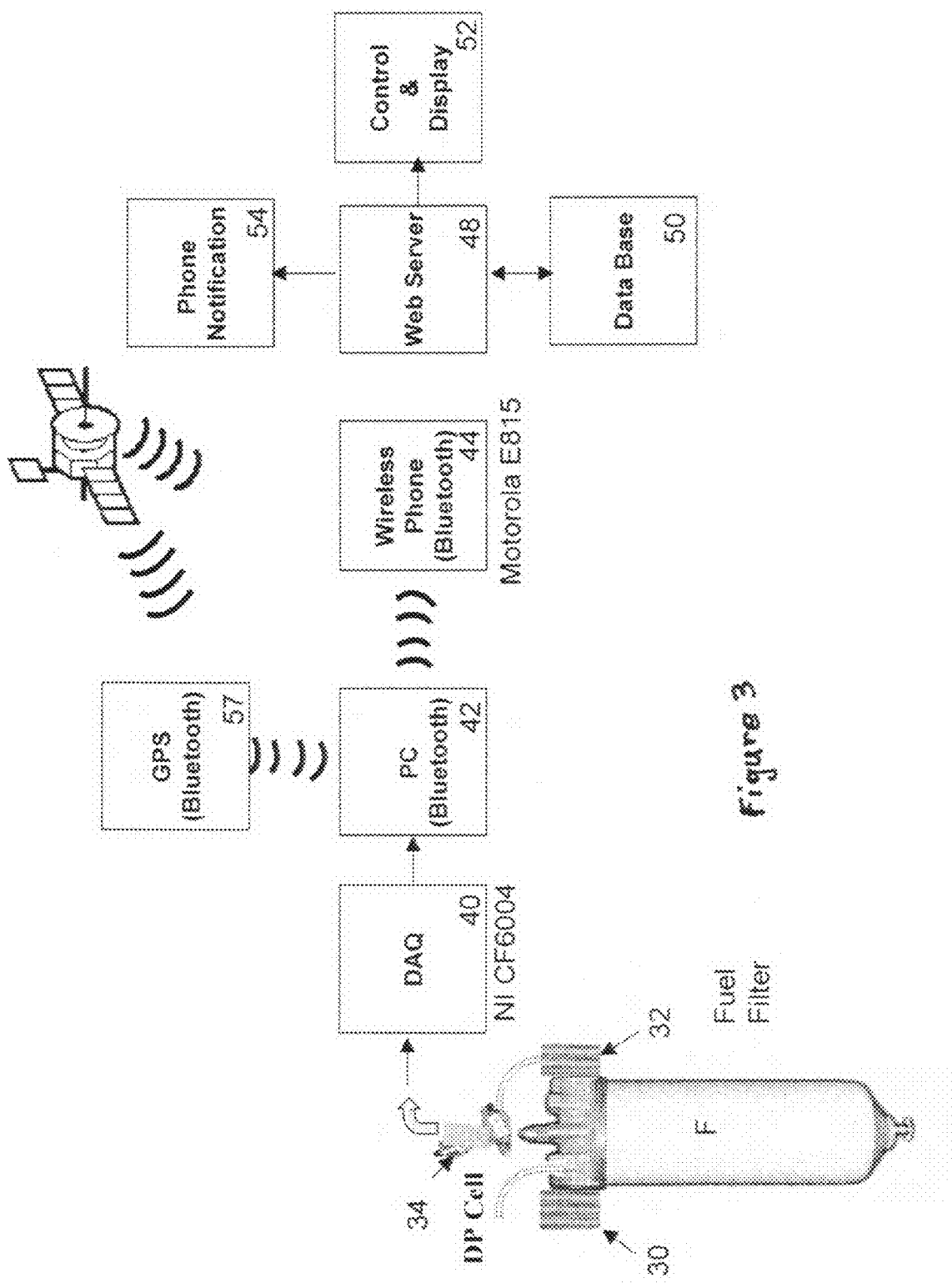
FIG. 3 is a schematic view of an alternative embodiment of a fuel filter monitoring system.

Each dispenser 14, 16, 18 and 20 includes at least one fuel filter F as shown in FIGS. 2 and 3.

The preferred embodiment as shown in FIG. 2 includes a fuel filter F connected to an incoming fuel line 30 and an outgoing fuel line 32. Also connected to each fuel line 30 and 32 is a differential pressure sensor cell 34 which determines the fuel flow via a known algorithm through the filter F by comparing the incoming and outgoing fuel pressure and transmits a signal via an electronic connection such as a wire 36 to the sensor control panel 38. The sensor control panel 38 includes a data acquisition device 40 which may be a NI CF 6004 model sold by National Instruments Corporation. The components of the data acquisition device 40 include appropriate sensors that convert digital pressure sensor cell output which is preferably an analog output to an electrical signal, which is acquired by data acquisition hardware in the data acquisition device 40. The data acquisition device 40 then transmits the collected data either by a universal asynchronous receiver transmitter or wirelessly such as by a Bluetooth® or WiMAX transmission to a computer 42 or alternatively to a PC card or to a PDA. The computer 42 preferably also has recorded therein its Global Positioning System (GPS) coordinates or may include a GPS receiver which can continuously monitor its location by communication with the GPS satellites S. The computer 42 is connected either electronically by a phone jack or RJ-11 or again wirelessly such as a Bluetooth® or WiMAX connection to phone modem 44 or alternatively a cell phone modem so that the information can be transmitted to a monitoring center 46 which includes a web server 48, a data base 50 and a control and display device 52. The monitor and display device 52 may be a computer screen and a keyboard (not shown). A technician may also input log history or other information into computer 42 at the fuel station by attaching a keyboard to the computer, PC card or PDA 42. The monitoring center 46 can receive the transmitted information from the sensor control panel 38 either through a wired connection or wirelessly such as a Bluetooth® or WiMAX connection. Upon a determination that the signal received from the differential pressure sensor cell 34 indicates a clogged and/or degraded fuel filter F the monitoring center 46 sends an alarm from the web server 48 to a telecommunications device 54 at the location of a technician. The telecommunications device 54 preferably is a device capable of receiving a text message generated by the web server that indicates the filter malfunction, outage or degradation analysis the type of filter F and directions to its location so that when the technician receives the message, he can bring the correct replacement filter to the station 12 and quickly bring the dispenser back into operation. The alarm data may also be transmitted to the station owner 56.

The differential pressure cell 34 and the sensor control panel 38 and the monitoring center may be powered with the same power supply that operates the pumps 14, 16, 18 and 20 or individual components may be battery powered.

The method of monitoring and signaling will now be described with respect to FIG. 2. The fuel flow through a filter F is monitored by a digital pressure sensor cell 34 and the signal produced by the differential pressure cell 34 is transmitted to the sensor control panel 38 which processes the signal. The sensor control panel 38 is preferably programmed to continuously analyze for flow degradation and determine the alarm thresholds for fuel flow through the filter F and contact the monitoring center 46 when the fuel flow thresholds or degradation rate is reached and provides the monitoring center with the location of the fuel station 10 and that a replacement filter F is needed. The monitoring center 46 then extracts the technical data from the database 50 and sends an alarm message to a technician that filter F repair is required. The alarm message is preferably a text message that includes the location of the fuel station. It is further contemplated that the location data may alternatively be in the form of a map and could also identify any special tools required or other information specific to that fuel station.

It should also be understood by those skilled in the art that the alarm system may be applicable to other situations in fuel service stations or otherwise where continuous monitoring and transmission of a remote alarm signal is important.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as maybe applied to the central features hereinbefore set forth, and fall within the scope of the invention and the limits of the appended claims.

I claim:
1. A monitoring system comprising:
 a) a differential pressure cell adapted for connection to an incoming fuel line and an outgoing fuel line at a fuel filter;
 b) said differential pressure cell is electronically connected to a sensor control panel having a data acquisition device which transfers fuel flow data received from said differential pressure cell via a universal asynchronous receiver transmitter to a data storage device;
 c) said data storage device is electronically connected to a monitoring center having a web server and a database and a control and display device; and,
 d) said web server being adapted for communication with a telecommunication device to provide information based upon said fuel flow data; and,
 e) said data storage device contains GPS location data.
2. The monitoring system as set forth in claim 1, wherein;
 a) said GPS location designates the location of said fuel filter.
3. The monitoring system as set forth in claim 1, wherein;
 a) said data storage device is a PC card.
4. The monitoring system as set forth in claim 1, wherein;
 a) said data storage device is a PDA.
5. The monitoring system as set forth in claim 1, wherein;
 a) said data storage device is a computer.
6. The monitoring system as set forth in claim 1, wherein;
 a) said telecommunications device is a telephone.
7. A monitoring system comprising:
 a) a differential pressure cell adapted for connection to an incoming fuel line and an outgoing fuel line at a fuel filter;
 b) said differential pressure cell is electronically connected to a sensor control panel having a data acquisition device which transfers fuel flow data received from said differential pressure cell via a wireless transmitter to a data storage device;
 c) said data storage device is electronically connected to a monitoring center having a web server and a database and a control and display device;
 d) said web server being adapted for communication with a telecommunication device to provide information based upon said fuel flow data; and
 e) said data storage device contains GPS location data.
8. The monitoring system as set forth in claim 7, wherein;
 a) said GPS location designates the location of said fuel filter.
9. The monitoring system as set forth in claim 7, wherein;
 a) said data storage device is a PC card.
10. The monitoring system as set forth in claim 7, wherein;
 a) said data storage device is a PDA.
11. The monitoring system as set forth in claim 7, wherein;
 a) said telecommunications device is a telephone.
12. The monitoring system as set forth in claim 7, wherein;
 a) said data storage device is a computer PDA.
13. A method of monitoring fuel station equipment comprising the steps of:
 a) connecting a monitoring device to a fuel supply line in a fuel station dispensing unit to determine the performance of a fuel supply filter;
 b) collecting performance data and supplying said data to a data storage device;
 c) transmitting said performance data from said data storage device to a location remote from said monitoring device; and
 d) receiving and storing GPS location data.

14. The method as set forth in claim 13, further comprising the step of:
 a) transmitting said GPS data to said location remote from said monitoring device.

15. The method as set forth in claim 13, wherein;
 a) transmitting includes sending via telecommunications said performance data and said GPS location data.

16. The method as set forth in claim 13, wherein;
 a) said data storage device is a computer.

17. The method as set forth in claim 15, wherein;
 a) transmitting include wireless transmission of said performance data.

18. The method as set forth in claim 13, wherein;
 a) said monitoring device is a differential pressure cell adapted for connection to an incoming fuel line and an outgoing fuel line at a fuel filter.

\* \* \* \* \*